(12) United States Patent
Rho et al.

(10) Patent No.: US 8,049,852 B2
(45) Date of Patent: Nov. 1, 2011

(54) LIQUID CRYSTAL DISPLAY DEVICE AND METHOD OF MANUFACTURING THE SAME

(75) Inventors: Soon-Joon Rho, Suwon-si (KR); Jang-Sub Kim, Suwon-si (KR); Baek-Kyun Jeon, Yongin-si (KR); Hee-Keun Lee, Suwon-si (KR); Jae-Chang Kim, Busan (KR); Tae-Hoon Yoon, Busan (KR); Phil-Kook Son, Busan (KR); Bong-Kyun Jo, Busan (KR)

(73) Assignees: Samsung Electronics Co., Ltd. (KR); Pusan National University (KR)

( * ) Notice: Subject to any disclaimer, the term of this patent is extended or adjusted under 35 U.S.C. 154(b) by 246 days.

(21) Appl. No.: 12/421,083

(22) Filed: Apr. 9, 2009

(65) Prior Publication Data

US 2009/0296034 A1   Dec. 3, 2009

(30) Foreign Application Priority Data

May 28, 2008   (KR) .................. 10-2008-0049637

(51) Int. Cl.
*G02F 1/1337* (2006.01)
(52) U.S. Cl. .............. 349/129; 349/124; 349/128
(58) Field of Classification Search .............. None
See application file for complete search history.

(56) References Cited

U.S. PATENT DOCUMENTS

| | | | |
|---|---|---|---|
| 5,030,322 A * | 7/1991 | Shimada et al. | 216/23 |
| 6,061,115 A * | 5/2000 | Samant et al. | 349/129 |
| 6,313,896 B1 | 11/2001 | Samant et al. | |
| 6,335,776 B1 * | 1/2002 | Kim et al. | 349/129 |
| 6,346,975 B2 * | 2/2002 | Chaudhari et al. | 349/124 |
| 6,593,586 B2 | 7/2003 | Chaudhari et al. | |
| 2004/0201806 A1 * | 10/2004 | Choo et al. | 349/129 |
| 2005/0094072 A1 | 5/2005 | Lu et al. | |
| 2007/0148988 A1 | 6/2007 | Chen et al. | |
| 2009/0244461 A1 * | 10/2009 | Rho et al. | 349/129 |

FOREIGN PATENT DOCUMENTS

| | | |
|---|---|---|
| JP | 11352486 | 12/1999 |
| JP | 2001296528 | 10/2001 |
| JP | 2003222873 | 8/2003 |
| JP | 2004318151 | 11/2004 |
| JP | 2007163711 | 6/2007 |

(Continued)

OTHER PUBLICATIONS

Machine translation of KR 10-2007-0060815A (application published Jun. 13, 2007).*

(Continued)

*Primary Examiner* — Mike Stahl
(74) *Attorney, Agent, or Firm* — Cantor Colburn LLP

(57) ABSTRACT

The present invention relates to a method of manufacturing a liquid crystal display, the method including; disposing a thin film transistor having an input terminal and an output terminal on a first substrate, connecting a pixel electrode to the output terminal, disposing an organic layer on the pixel electrode, forming a first alignment layer having at least two different alignment directions by disposing a mask on the organic layer and radiating an ion beam to the organic layer, disposing a common electrode on a second substrate corresponding to the first substrate, forming a second alignment layer having at least two different alignment directions on the common electrode, and disposing a liquid crystal layer between the first alignment layer and the second alignment layer.

25 Claims, 12 Drawing Sheets

FOREIGN PATENT DOCUMENTS

| | | |
|---|---|---|
| KR | 1020040083127 | 10/2004 |
| KR | 1020040083181 | 10/2004 |
| KR | 1020040098327 | 11/2004 |
| KR | 1020060032349 | 4/2006 |
| KR | 1020070060814 | 6/2007 |
| KR | 1020070060815 | 6/2007 |

OTHER PUBLICATIONS

J.S. Gwag et al. Polyimide surface bombarded with Ar atomic beam. Japanese Journal of Applied Physics, vol. 42, L468-L471, May 2003.*

* cited by examiner

100

200

100

200

LIQUID CRYSTAL DISPLAY DEVICE AND METHOD OF MANUFACTURING THE SAME

This application claims priority to and the benefit of Korean Patent Application No. 10-2008-0049637, filed on May 28, 2008, and all the benefits accruing therefrom under 35 U.S.C. §119, the contents of which in its entirety are herein incorporated by reference.

BACKGROUND OF THE INVENTION (a) Field of the Invention

The present invention relates to liquid crystal display device ("LCD") and a method of manufacturing the same. More particularly, the present invention relates to a method of manufacturing an LCD using an ion beam alignment method.

(b) Description of the Related Art

A liquid crystal display ("LCD") is one of the most popular display devices. A typical LCD includes two display panels each having a substrate with a field generating electrode, and a liquid crystal layer interposed between the two display panels. The LCD controls an amount of light transmitted therethrough by controlling the alignment of liquid crystal molecules of the liquid crystal layer by applying a voltage to the field generating electrodes.

Although the LCD has a drawback of a narrow viewing angle due to the optical anisotropy of liquid crystal molecules, an optically compensated bend ("OCB") mode, an in-plane switching ("IPS") mode, and various vertical alignment modes using a plurality of domains have been introduced to realize a wide viewing angle. The plurality of domains may be formed by artificially distorting the electric field.

In order to form the plurality of domains, a protrusion or a cutout has been formed on the field generating electrode. In this method of domain formation the plurality of domains are formed by aligning liquid crystal molecules vertically to a flange field by the flange field that is formed between an edge of the protrusion or the cutout and a field generating electrode facing the edge. However, a process of forming the protrusion or the cutout is very complicated, and it increases the manufacturing cost of a display device. Also, the aperture ratio of the LCD is reduced. Further, a random motion is generated at liquid crystal molecules located at the center of a pixel, far away from the cutout, even though liquid crystal molecules adjacent to the protrusion or the cutout are easily aligned vertically to the flange field. Therefore, response speed is decreased, and an afterimage may be generated due to a reverse-direction domain.

As another method for forming a plurality of domains in one pixel, a photo-alignment method and an ion beam alignment method have been introduced. In the photo-alignment method and the ion beam alignment method, an alignment direction and an alignment angle of liquid crystal molecules are controlled by radiating light or ions to an alignment layer. Therefore, it is possible to increase the aperture ratio because it is not necessary to form a protrusion or a cutout on a field generating electrode in the photo-alignment method and the ion beam alignment method. It is also possible to improve the response time of liquid crystal molecules due to a pretilt angle that is generated when photo-alignment or ion beam alignment is performed. Furthermore, if a protrusion or cutout is additionally formed after performing the ion beam alignment, the response time of the liquid crystal may be further improved because friction defects caused by rubbing alignment, another form of alignment layer formation, are prevented and defects are not generated even though the liquid crystal molecules are not completely aligned.

BRIEF SUMMARY OF THE INVENTION

The present invention provides a method for manufacturing a liquid crystal display having advantages of preventing display defects by reducing a bad alignment region, and sustaining substantial anchoring energy.

An exemplary embodiment of the present invention provides a liquid crystal display including; a first substrate, a gate line disposed on the first substrate, a data line disposed substantially perpendicular to the gate line on the first substrate, and a plurality of thin film transistors electrically connected to the gate line and the data line, a plurality of pixel electrodes disposed on the plurality of thin film transistors, respectively, a first organic alignment layer disposed on the plurality of pixel electrodes and including at least two alignment regions each having a different alignment direction from each other, and each alignment region having a pretilt direction substantially parallel with one of the data line and the gate line, a second substrate corresponding to the first substrate, a common electrode disposed on the second substrate, and a second organic alignment layer disposed on the common electrode and including at least two alignment regions each having a different alignment direction from each other and from the alignment directions of the at least two alignment regions of the first organic alignment layer, and each alignment region of the second organic alignment layer having a pretilt direction substantially parallel with the gate line.

In one exemplary embodiment, the organic layer may include polyimide ("PI").

In one exemplary embodiment, the liquid crystal display comprises a plurality of pixels, each pixel including one of the plurality of pixel electrodes, and wherein an alignment direction of the first organic alignment layer may have a pretilt angle which faces in a first direction which corresponds to an upward direction as seen from a top plan view in a first sub-pixel area and may have a pretilt angle which faces in a second direction substantially opposite to the first direction as seen from a top plan view in a second sub-pixel area in each pixel.

In one exemplary embodiment, an alignment direction of the second organic alignment layer corresponding to the first organic alignment layer may have a pretilt angle which faces a third direction which corresponds to a leftward direction as seen from a top plan view in an upper sub-pixel area and may have a pretilt angle which faces a fourth direction substantially opposite the third direction as seen from a top plan view in a lower sub-pixel area in each pixel.

In one exemplary embodiment, an alignment direction of the second organic alignment layer corresponding to the first organic alignment layer may have a pretilt angle which faces a fourth direction which corresponds to a rightward direction as seen from a top plan view in an upper sub-pixel and may have a pretilt angle which faces a third direction substantially opposite the fourth direction as seen from a top plan view in a lower sub-pixel in a pixel.

In one exemplary embodiment, the first sub pixel may be located to the left side of the second sub-pixel in each pixel as seen from a top plan view.

In one exemplary embodiment, the first organic alignment layer and the second organic alignment layer may be formed by radiating an ion beam at an angle tilted with respect to a normal direction of the respective first organic alignment layer and second organic alignment layer, and wherein the ion beam energy may be about 4 eV to about 60 eV, and the ion beam radiation density may be about $1 \times 10^{13}$ Ar+/s.cm$^2$ to about $2.5 \times 10^{13}$ Ar+/s.cm$^2$.

In one exemplary embodiment, an angle of radiating the ion beam may be about 60° to about 85° from a horizontal plane parallel to the normal surface of the respective first organic alignment layer and second organic alignment layer.

In one exemplary embodiment, the ion beam may be tilted in several directions during the formation of the first organic alignment layer and the second organic alignment layer, including to the left side, the right side, the top, and the bottom of the first substrate and the second substrate, and the ion beam is radiated at substantially the same angle from the horizontal plane.

In one exemplary embodiment, thicknesses of the first and second organic alignment layers may each be about 50 nm.

Another exemplary embodiment of the present invention provides a method for manufacturing a liquid crystal display, the method including; disposing a thin film transistor having an input terminal and an output terminal is formed on a first substrate, connecting a pixel electrode to the output terminal, disposing an organic layer on the pixel electrode, forming a first alignment layer having at least two different alignment directions by disposing a mask on the organic layer and radiating an ion beam to the organic layer, disposing a common electrode on a second substrate corresponding to the first substrate, forming a second alignment layer having at least two different alignment directions on the common electrode, and disposing a liquid crystal layer between the first alignment layer and the second alignment layer.

In one exemplary embodiment, the forming a first alignment layer may includes; radiating the ion beam at a first radiation angle in a first strip region in a pixel, and radiating an ion beam at a second radiation angle tilted substantially opposite to the first radiation angle in a second strip region in the pixel.

In one exemplary embodiment, the forming a second alignment layer may include radiating an ion beam at a third radiation angle which is tilted in the left direction as seen from a top plan view in an upper sub-pixel positioned at an upper side of a pixel, and radiating the ion beam at a fourth radiation angle which is tilted in the right direction as seen from a top plan view in a lower sub-pixel positioned at a lower side of the pixel.

In one exemplary embodiment, the forming a second alignment layer may include; radiating an ion beam at a fourth radiation angle which is tilted in the right direction as seen from a top plan view in an upper sub-pixel positioned at an upper side of a pixel, and radiating the ion beam at a third radiation angle which is tilted in the left direction as seen from a top plan view in a lower sub-pixel positioned at a lower side of the pixel.

In one exemplary embodiment, the first strip region may have a pretilt facing in an upward direction as seen from a top plan view by radiating an ion beam at the first radiation angle.

In one exemplary embodiment, a distance between the organic layer and the mask may be shorter than about 200 μm in the forming a first alignment layer.

In one exemplary embodiment, an angle of radiating an ion beam to the organic layer may be about 60° to about 85° from a surface of the first substrate in the forming a first alignment layer.

In one exemplary embodiment, the thickness of the organic layer may be about 50 nm.

In one exemplary embodiment, the organic layer may include polyimide ("PI").

In one exemplary embodiment, the ion beam source may be a cold hollow cathode ("CHC") ion beam source.

In one exemplary embodiment, the ion beam may include argon ions.

In one exemplary embodiment, a distance between the organic layer and the mask may be about 20 μm to about 50 μm when the ion beam is radiated.

In one exemplary embodiment, the mask may have opening for letting the ion beam pass, and the width of the opening may be about 100 μm to about 1000 μm.

In one exemplary embodiment, the mask may be made of one of stainless steel and aluminum.

According to an exemplary embodiment of the present invention, display defects may be prevented by reducing a bad alignment region, and it is possible to sustain substantial anchoring energy. Also, a plurality of domains may have high thermal stability for ion beam alignment.

DETAILED DESCRIPTION OF THE INVENTION

Figure 1:
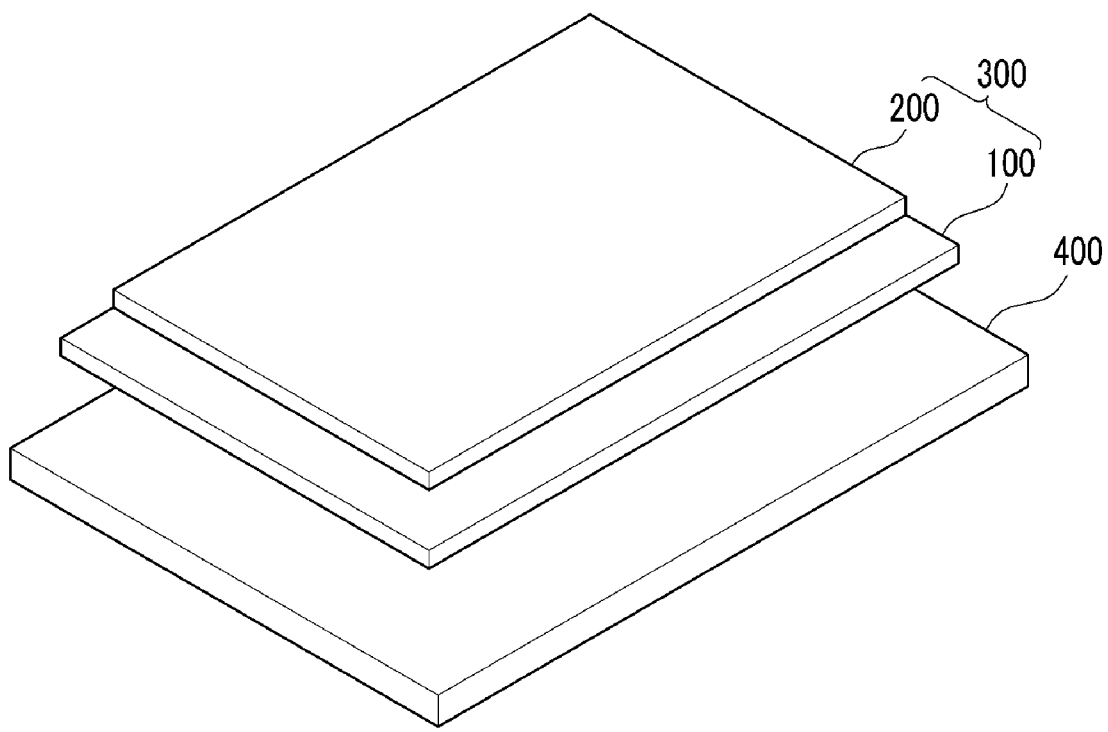
FIG. 1 is a front perspective view of an exemplary embodiment of a liquid crystal display ("LCD") according to the present invention.

The invention now will be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be throughout and complete, and will fully convey the scope of the invention to those skilled in the art. Like reference numerals refer to like elements throughout.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments of the present invention are described herein with reference to cross section illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present invention.

Hereinafter, a liquid crystal display ("LCD") according to an exemplary embodiment of the present invention will be described with reference to FIG. 1 and FIG. 2.

Figure 2:
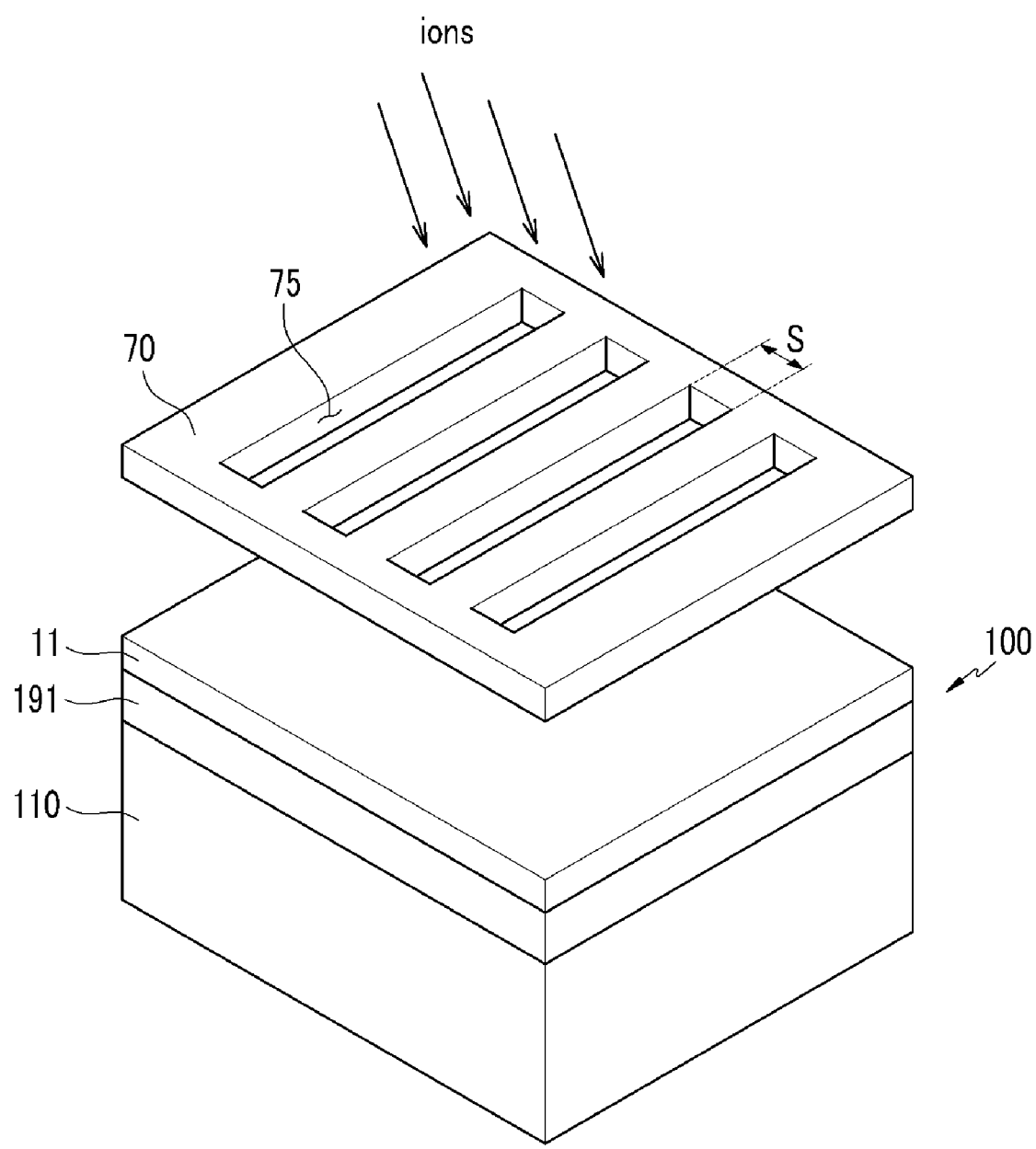
FIG. 2 is a front perspective view illustrating an exemplary embodiment of a thin film transistor ("TFT") display panel of FIG. 1 and an exemplary embodiment of a mask for ion beam alignment.

FIG. 1 is a front perspective view of an exemplary embodiment of an LCD according to the present invention, and FIG. 2 is a front perspective view illustrating a thin film transistor ("TFT") display panel of FIG. 1 and an exemplary embodiment of a mask for ion beam alignment.

Referring to FIG. 1 and FIG. 2, the LCD includes a display panel unit 300 and a lighting unit 400. The display panel unit 300 includes a TFT array panel 100, a common electrode panel 200, and a liquid crystal layer (not shown).

First, the TFT array panel 100 will be described. The TFT array panel 100 includes a substrate 110, a pixel electrode 191, and an alignment layer 11.

The substrate 110 may be made of a transparent insulating material, exemplary embodiments of which include glass and plastic. The pixel electrode 191 is formed on the substrate 110. The pixel electrode 191 is made of a transparent conductive material, exemplary embodiments of which include indium tin oxide ("ITO") and indium zinc oxide ("IZO").

A plurality of thin film structures (not shown) is formed between the substrate 110 and the pixel electrode 191. The thin film structures may include a TFT, a signal line such as a gate line and a data line disposed substantially perpendicularly to the gate line, a color filter, and a light blocking member. Hereinafter, an exemplary embodiment of the thin film structures will be briefly described.

A gate line is formed on the substrate 110. A gate insulating layer, a semiconductor, and an ohmic contact are sequentially formed on the gate line. A data line and a drain electrode are formed thereon. The gate line includes a plurality of gate electrodes, and the data line includes a plurality of source electrodes. The gate electrode, the semiconductor, the source electrode, and the drain electrode form a TFT. A passivation layer is formed on the semiconductor, the data line, and the drain electrode. A pixel electrode 191 is located on the passivation layer. The pixel electrode 191 is connected to the drain electrode through a contact hole formed at the passivation layer. Meanwhile, exemplary embodiments of the thin film structures may include one of a color filter and a common electrode formed on the semiconductor, or both of the color filter and the common electrode formed on the semiconductor.

An alignment layer is formed on the pixel electrode 191, and, in one exemplary embodiment, the alignment layer may be a vertical alignment layer. In one exemplary embodiment, the alignment layer 11 may be made of an organic material having a polymer, exemplary embodiments of which include polyimide ("PI") and other materials with similar characteristics.

The common electrode panel 200 faces the TFT array panel 100 and also may include a plurality of thin film structures.

The structure of the common electrode panel 200 will now be described with reference to FIG. 8.

A light blocking member is formed on the substrate 210. The light blocking member faces the pixel electrode 191 and includes a plurality of openings having a shape that is substantially identical to that of the pixel electrode 191. An overcoat is formed on the substrate 210 and the light blocking member. A common electrode 270 is formed on the overcoat. In one exemplary embodiment, a plurality of color filters is formed between the substrate 210 and the passivation layer. Each color filter is mostly disposed in the opening of the light blocking member and may display a primary color such as one of the three primary colors of red, green, and blue. Alternative exemplary embodiments include configurations wherein the color filter may be omitted from the common electrode panel 200. An alignment layer 21 made of an organic material is formed on the common electrode 270. The alignment layers 11 and 21 may be formed to include a plurality of regions having different alignment directions in each pixel, or having different alignment directions from adjacent pixels.

A liquid crystal layer is interposed between the alignment layers. Liquid crystal molecules of a liquid crystal layer in one pixel are controlled to have different alignment directions, thereby forming a plurality of domains. The alignment directions of the liquid crystal molecules are determined by anchoring energy, and the anchoring energy receives great influence from the alignment layers 11 and 21. As will be discussed in more detail below, the alignment layers 11 and 21 may be formed by radiating an ion beam to an organic layer. One of the alignment layers 11 and 21 is formed by an ion beam radiated from a direction substantially parallel to the gate line, and the other is formed by an ion beam radiated from a direction substantially parallel to the data line, which, as described above, is substantially perpendicular to the gate line.

In order to form an alignment layer 11, a mask 70 having a plurality of openings 75 is disposed over an organic layer and the organic layer is exposed to an ion beam passing through the plurality of openings 75. The mask 70 includes the plurality of openings 75, each of which has a longitudinal axis formed in a direction substantially perpendicular to a longitudinal side of the substrate 110. Alternatively, the plurality of openings 75 may be formed to each have a longitudinal axis substantially in parallel with the longitudinal side of the substrate. The width ("s") of each of the openings 75 of the mask 70 may be from about 100 μm to about 2000 μm. In one exemplary embodiment, the mask 70 may be made of stainless steel, aluminum or other materials having similar characteristics.

The lighting unit 400 applies light to the display panel unit 300. In one exemplary embodiment, the lighting unit 400 includes a light source, a light guide, and a reflecting member. Exemplary embodiments of the light source include a fluorescent lamp, a light emitting diode ("LED"), or other similar devices. In one exemplary embodiment, the light source radiates light with a predetermined regular intensity regardless of the state of the LCD. In the exemplary embodiments where present, the light guide guides light radiated from the light source, and the reflecting member minimizes light loss by reflecting the light from the light guide to the display panel unit 300.

Hereinafter, an exemplary embodiment of a method for manufacturing an exemplary embodiment of an LCD according to the present invention will be described with reference to FIG. 3 to FIG. 11.

Figure 3:
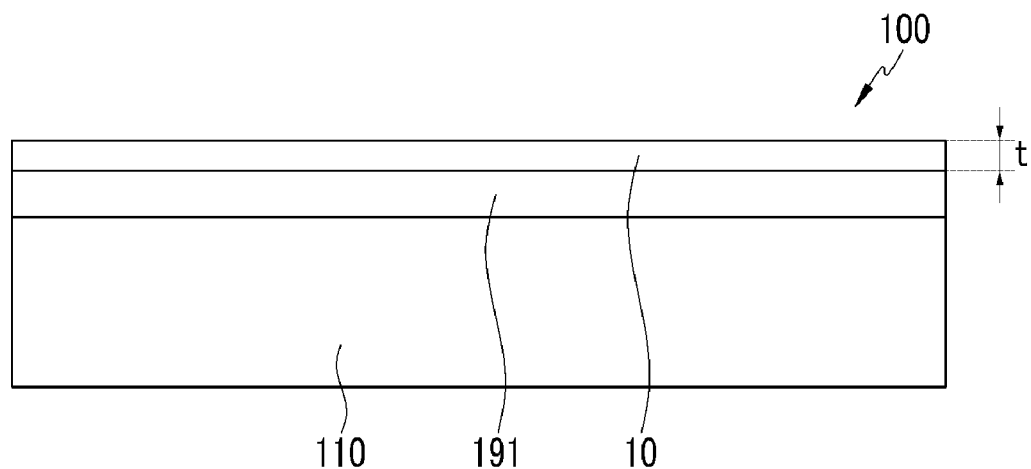
FIGS. 3 and 4 are cross-sectional views illustrating an exemplary embodiment of a method for manufacturing an exemplary embodiment of an LCD according to the present invention.
Figure 4:
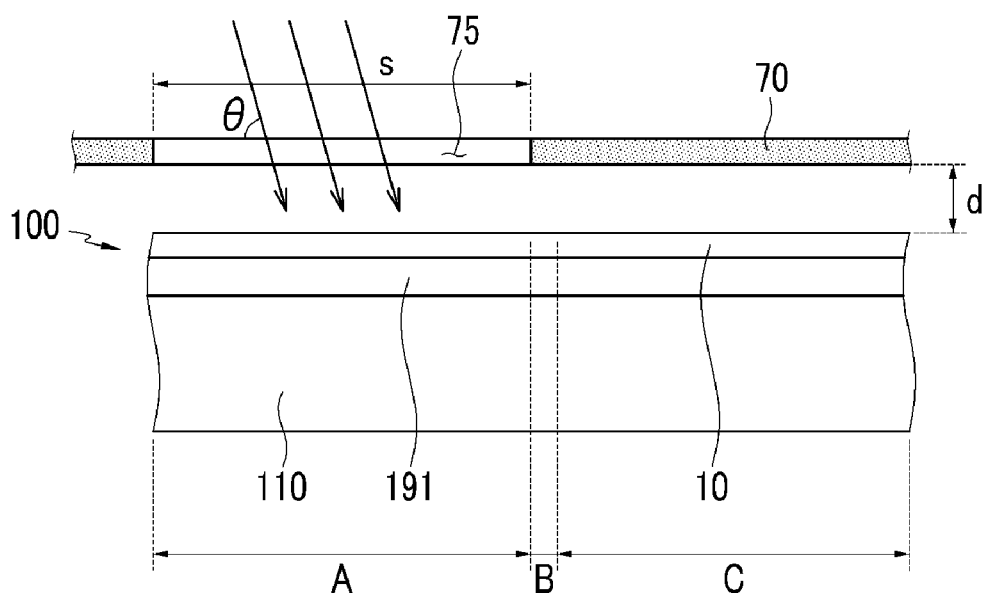
Figure 5:
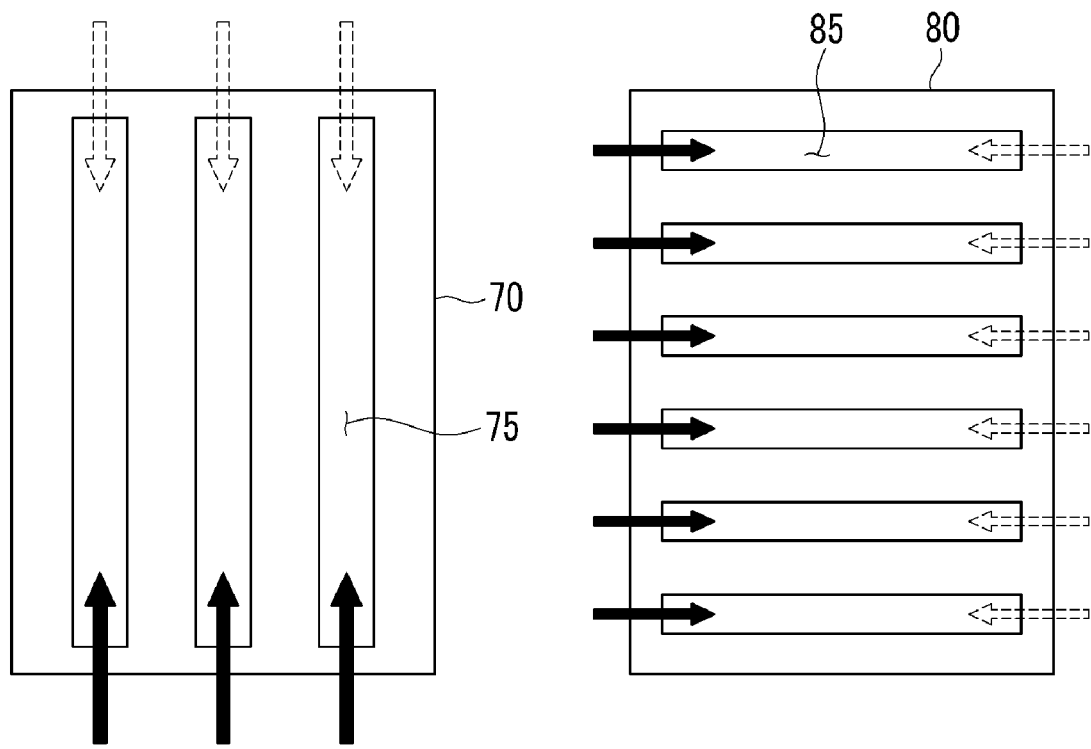
FIG. 5 is a schematic diagram of exemplary embodiments of a first mask and a second mask according to the present invention.

FIGS. 3 and 4 are cross-sectional views illustrating an exemplary embodiment of a method for manufacturing an exemplary embodiment of an LCD according to the present invention are cross-sectional views for describing an exemplary embodiment of a method of manufacturing a LCD. Particularly, FIG. 5 is a schematic diagram illustrating two masks used for ion beam alignment, FIG. 6 to FIG. 9 are cross-sectional views showing a method for radiating an ion beam using the mask of FIG. 5, and FIG. 10 and FIG. 11 are schematic diagrams illustrating an alignment direction of liquid crystal molecules formed by the ion beam alignment method.

As shown in FIG. 3, thin film structures, such as signal lines and a TFT are formed on the substrate 110. Then, a pixel electrode 191 is formed on the thin film structures to be connected to an output terminal of the TFT.

Then, an organic layer 10 is formed by stacking polyimide ("PI") on the pixel electrode 191. The organic layer 10 may be deposited through a spin coating method, a print method, an Inkjet print method, and various other method as would be known to one of ordinary skill in the art. A thickness ("t") of the organic layer may be about 100 nm to about 300 nm, a forming temperature may be room temperature, and a baking temperature may be about 100° C. to about 200° C.

As shown in FIG. 4, a mask 70 is disposed on the organic layer 10, and an ion beam is firstly radiated to a region "A" through openings 75. Here, the ion beam is radiated with a predetermined tilt angle ("θ"). Then, the openings 75 of the mask 70 are disposed on a region "C", and the ion beam is radiated again. In this exemplary embodiment, the ion beam is radiated at a predetermined tilt angle ("θ") substantially equal to the predetermined tilt angle θ of the first ion beam radiation. However, alternative exemplary embodiments include configurations wherein the radiation direction of the ion beam may be substantially opposite in direction to that of the first ion beam radiation e.g., at a predetermined angle ($-\theta$). By radiating the ion bean in this way, the organic layer 10 is transformed into the alignment layers 11 and 21. Here, a region "B" is a bad alignment region, for example a region where an ion beam is only indirectly radiated.

In the present exemplary embodiment, the first ion beam radiation angle ("θ") may be about 60° to about 85°, the ion beam energy may be about 40 eV to about 60 eV, and the ion beam radiation density may be about $1 \times 10^{13}$ $Ar^+/s.cm^2$ to about $2.5 \times 10^{13}$ $Ar^+/s.cm^2$. A width ("s") of the opening 75 of the mask 70 may be about 100 μm to about 1000 μm, and a distance ("d") between the mask 70 and the surface of the alignment layer 11 may be equal to or shorter than about 200 μm. The secondary ion beam radiation conditions are substantially identical to the first ion beam radiation conditions except for the second ion beam radiation angle ($-\theta$).

If the ion beam alignment is performed with the described conditions, the anchoring energy can be secured higher than about $1 \times 10^{-4} J/m^2$, and the thermal stability of the plurality of domains can be secured up to 120° C. A width of the bad alignment region ("B") may be narrower than about 20 μm. Since the light blocking member completely blocks the bad alignment region ("B") if the bad alignment region ("B") is narrower than about 20 μm, display defects are not generated by the bad alignment region ("B").

The common electrode panel 200 having the common electrode 270 and the alignment layer 21 will be connected to the TFT array panel 100. Forming conditions for the alignment layer 21 of the common electrode panel 200 are substantially identical to those described above.

Then, in the present exemplary embodiment, a liquid crystal layer is deposited on the TFT array panel 100 or the common electrode panel 200, and the two display panels 100 and 200 are then bonded together. Alternatively, the liquid crystal layer may be injected after bonding the two display panels 100 and 200. In such an exemplary embodiment, a plurality of domains having different pretilt directions may be formed by the alignment layers 11 and 21 having different alignment directions.

Hereinafter, an ion beam alignment method will be described with reference to FIG. 5 to FIG. 9.

Referring to FIG. 5, a mask used for ion beam alignment includes a first mask 70 and a second mask 80. The first mask 70 includes a plurality of openings 75 formed in a direction substantially parallel with a longitudinal side of the substrate. The second mask 80 includes a plurality of openings 85 formed in a direction substantially perpendicular to a longitudinal side of the substrate.

Figure 6:
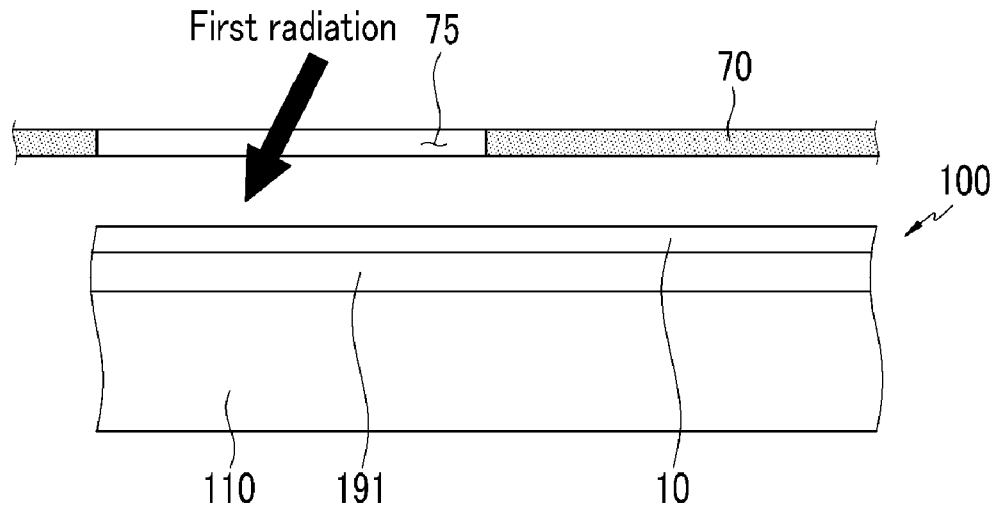
FIGS. 6-9 are cross-sectional views illustrating an exemplary embodiment of a method for manufacturing an exemplary embodiment of an LCD according to the present invention.
Figure 7:
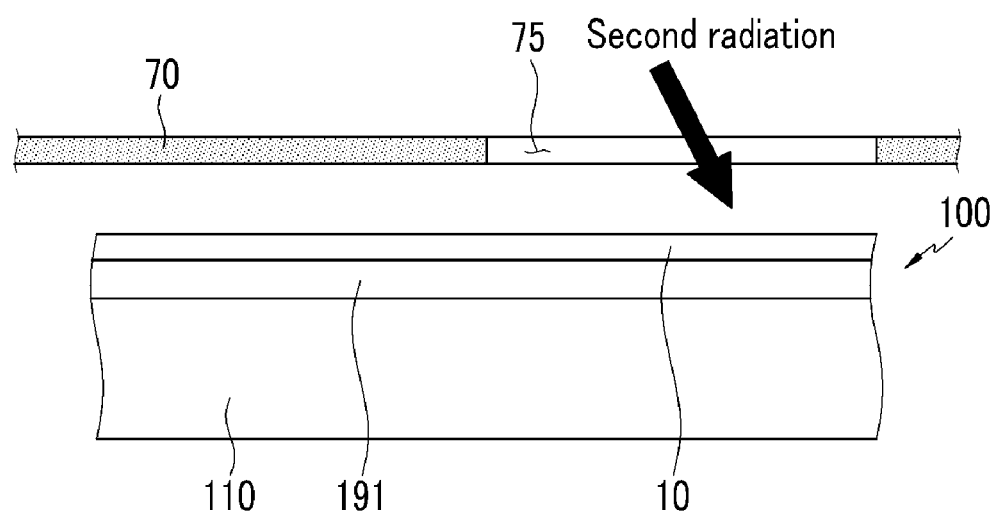

Referring to FIG. 5, FIG. 6, and FIG. 7, the first mask 70 is disposed on the TFT array panel 100 having the alignment layer 11 coated thereon, and an argon ion beam or a CHC ion beam is radiated at a predetermined tilt angle, although alternative ion beams may be used as would be apparent to one of ordinary skill in the art. Then, the ion beam is radiated again in the opposite direction of the first ion beam radiation.

Here, the ion beam is radiated while moving in a direction substantially parallel with a longitudinal direction of the opening 75 of the mask 70, that is, a top to bottom direction (arrow direction) in FIG. 5. In order to expose the surface of the alignment layer 11 to the ion beam at a predetermined angle, the substrate 110 may be tilted at a predetermined angle or an ion beam radiating device (not shown) may tilted at a predetermined angle (or a combination of the two).

Figure 10A:
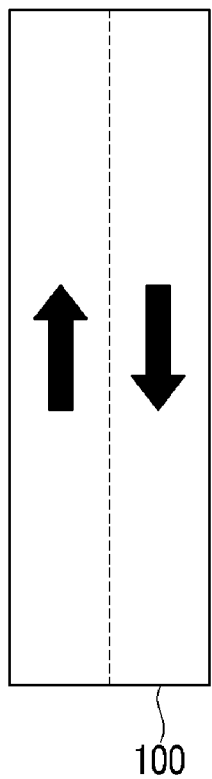
FIGS. 10A-C and 11A-C are schematic diagram illustrating alignment directions of liquid crystal molecules according to the present invention.
Figure 11A:
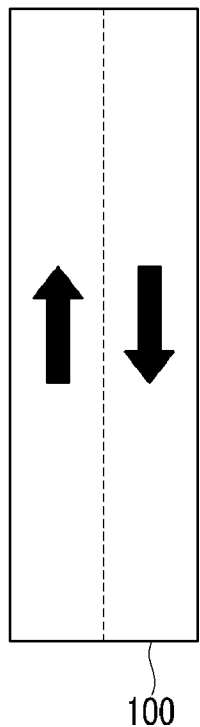

In one exemplary embodiment, the ion beam is radiated at a predetermined tilt angle from the bottom to the top in a left half of a pixel area, and the ion beam is radiated at a predetermined tilt angle from the top to the bottom in a right half of the pixel area. Accordingly, two regions with opposite directions can be formed in each pixel area as shown in FIG. 10A and FIG. 11A.

Figure 8:
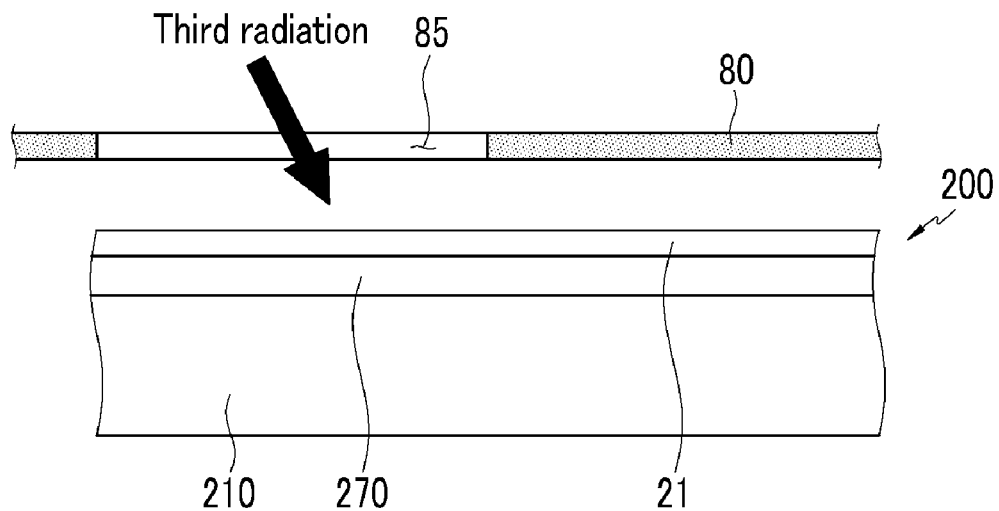
Figure 9:
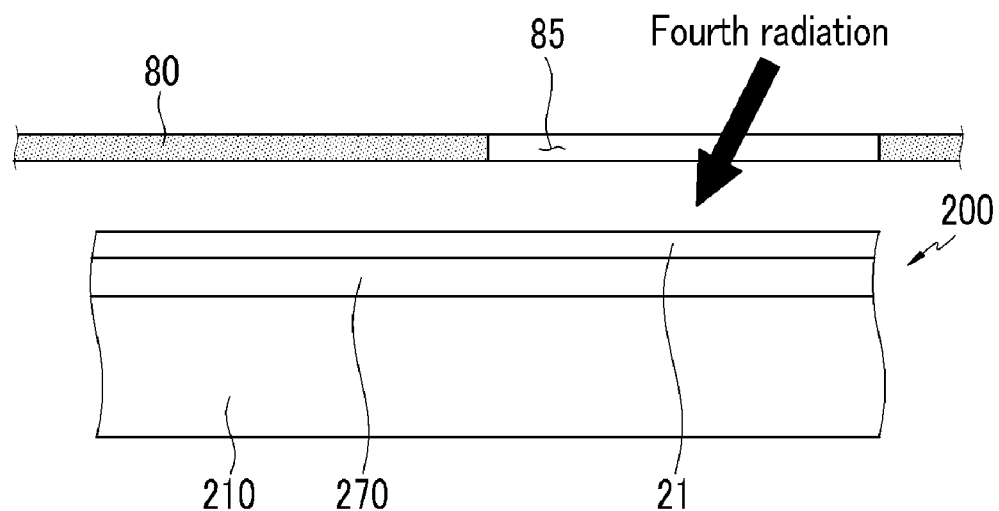

Referring to FIG. 5, FIG. 8, and FIG. 9, the second mask 80 is disposed on the common electrode panel 200 with the alignment layer 21 coated thereon, and an ion beam, an exemplary embodiment of which includes an argon ion beam, is thirdly radiated at a predetermined tilt angle. Then, an ion beam is fourthly radiated in substantially the opposite direction of the third ion beam radiation.

Figure 10B:
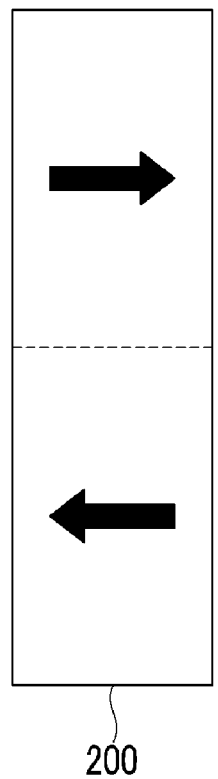
Figure 11B:
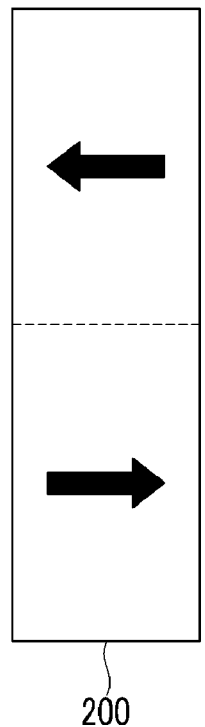

Here, the ion beam radiation is performed while moving in a direction substantially parallel with the longitudinal axis of the opening 85 of the mask 80. That is, the ion beam radiation is performed while moving in a left to right direction (arrow direction) in FIG. 5. As another example, two regions each having substantially opposite pretilt directions may be formed as shown in FIG. 10B by forming an upper half of a pixel area to have a pretilt from the left to the right and by forming a lower half of the pixel area to have a pretilt from the right to the left. Also, two regions each having substantially opposite pretilt directions may be formed as shown in FIG. 11B by forming an upper half of a pixel area to have a pretilt from the right to the left and by forming a lower half of the pixel area to have a pretilt from the left to the right.

As described above, by radiating an ion beam to the surface of the alignment layers 11 and 21 at a predetermined tilt angle, it is possible to provide the same effect as rubbing the surfaces of the alignment layers 11 and 21 in a uniform direction. That is, the alignment direction of the surface of the alignment layers 11 and 21 is changed according to the ion beam radiation direction. Therefore, a plurality of domains having different pretilt directions can be formed in a pixel by radiating an ion beam after dividing the pixel into a plurality of regions.

Figure 10C:
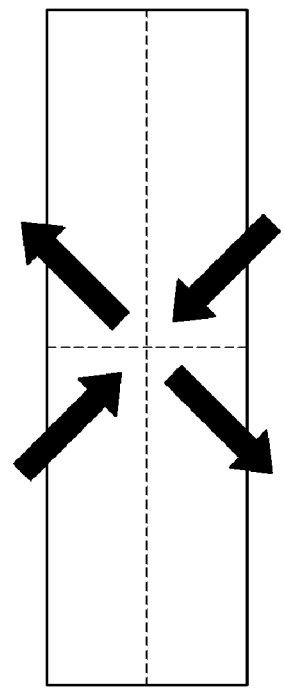
Figure 11C:
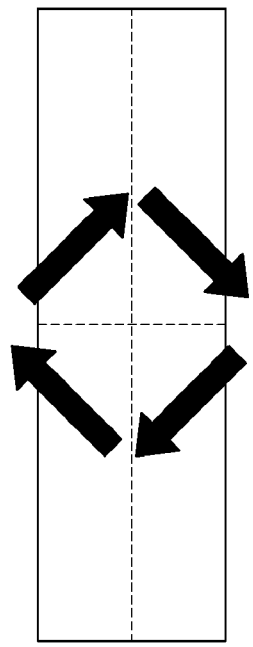

Referring to FIGS. 10A-C and FIGS. 11A-C, if the TFT array panel 100 having a left half and a right half with an ion beam radiated in opposite directions thereon and the common electrode panel 200 having an upper half and a lower half with light radiated in opposite directions thereon are adhered together, it is possible to form four domains that can be aligned in an upper left direction, a lower left direction, an upper right direction, and a lower right direction on average as shown in FIG. 10C and FIG. 11C.

In the present exemplary embodiment, a plurality of domains is formed by dividing a single pixel into a plurality of strip regions and radiating the ion beam in different directions. Unlike the present exemplary embodiment, one strip region may be formed by grouping a plurality of pixels, and the ion beam may be radiated in a different direction from that of an adjacent strip region to make the alignment direction of the liquid crystal molecules different between adjacent pixels. For example, if a TFT array panel having a left pixel array and a right pixel array with an ion beam radiated in opposite directions is bonded with a common electrode panel having an upper pixel row and a lower pixel row with the light radiated in opposite directions in an LCD including four pixels forming a 2×2 matrix, liquid crystal molecules may be aligned in an upper left direction, a lower left direction, an upper right direction, and a lower right direction of each domain in the four pixels.

The effect provided if the ion beam alignment is performed according to the above-described conditions and method will be described with reference to experimental data shown in FIG. 12 to FIG. 15, and FIG. 3 and FIG. 4.

Figure 12:
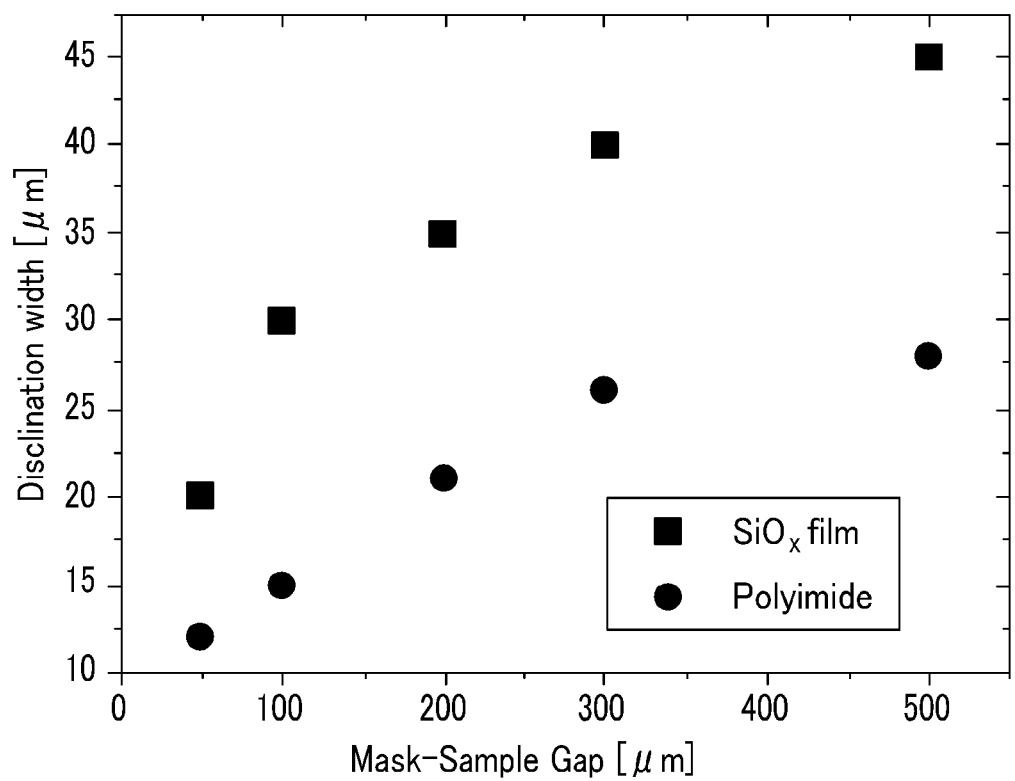
FIG. 12 is a graph illustrating the size of a bad alignment region according to a distance between an alignment layer and a mask.
Figure 13:
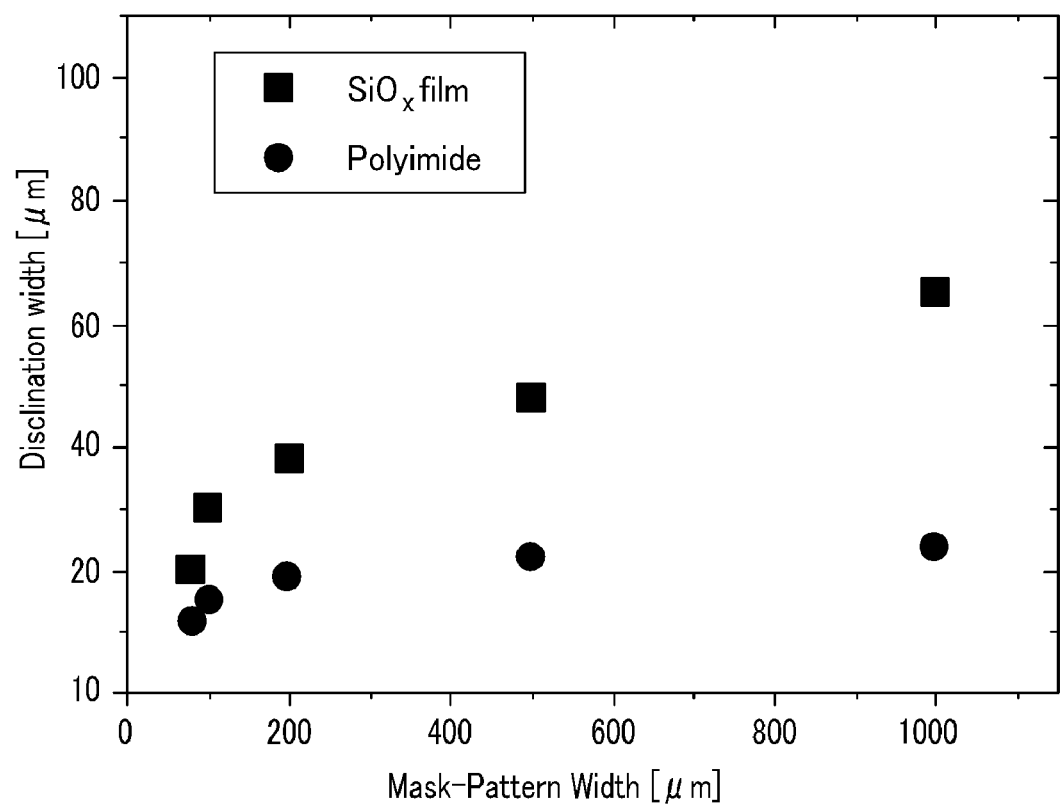
FIG. 13 is a graph illustrating the size of a bad alignment region according to a pattern of a mask.
Figure 14:
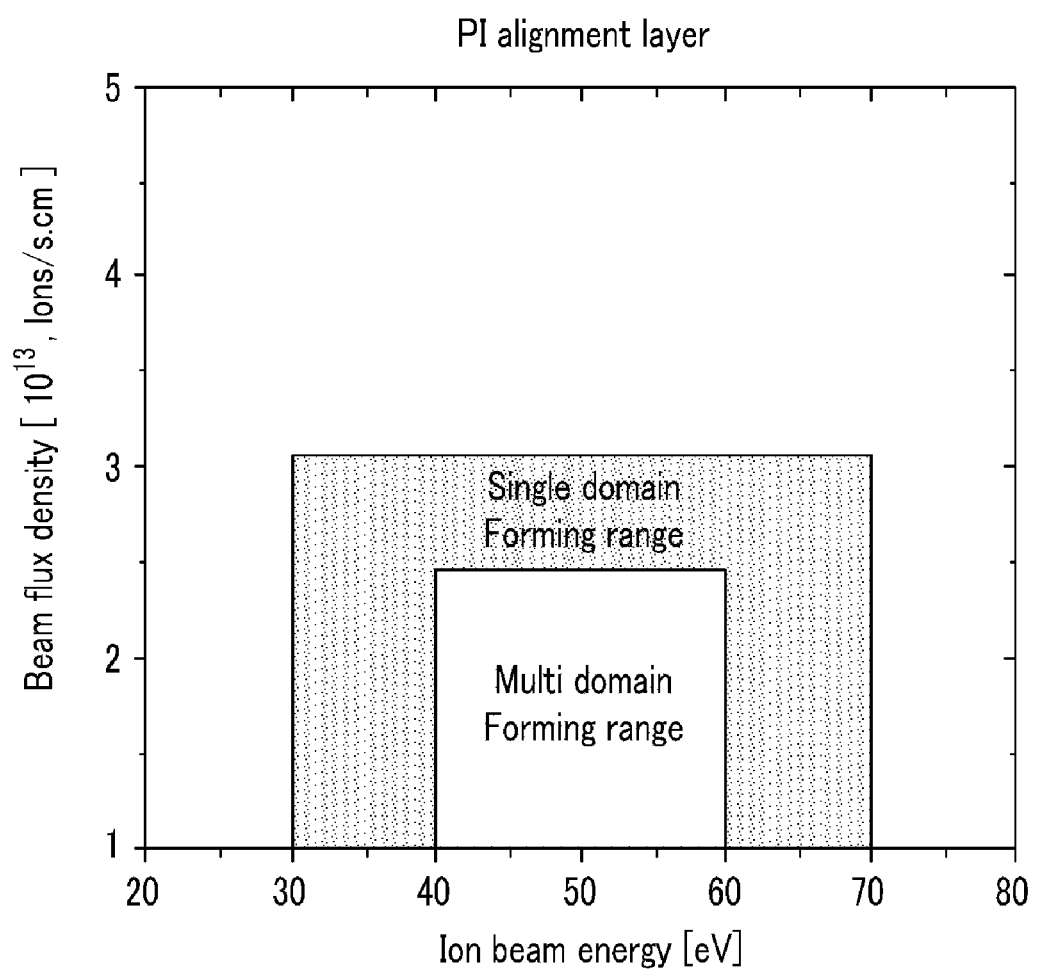
FIG. 14 is a graph illustrating an ion beam energy range and an ion beam radiation density range for forming a plurality of domains.
Figure 15:
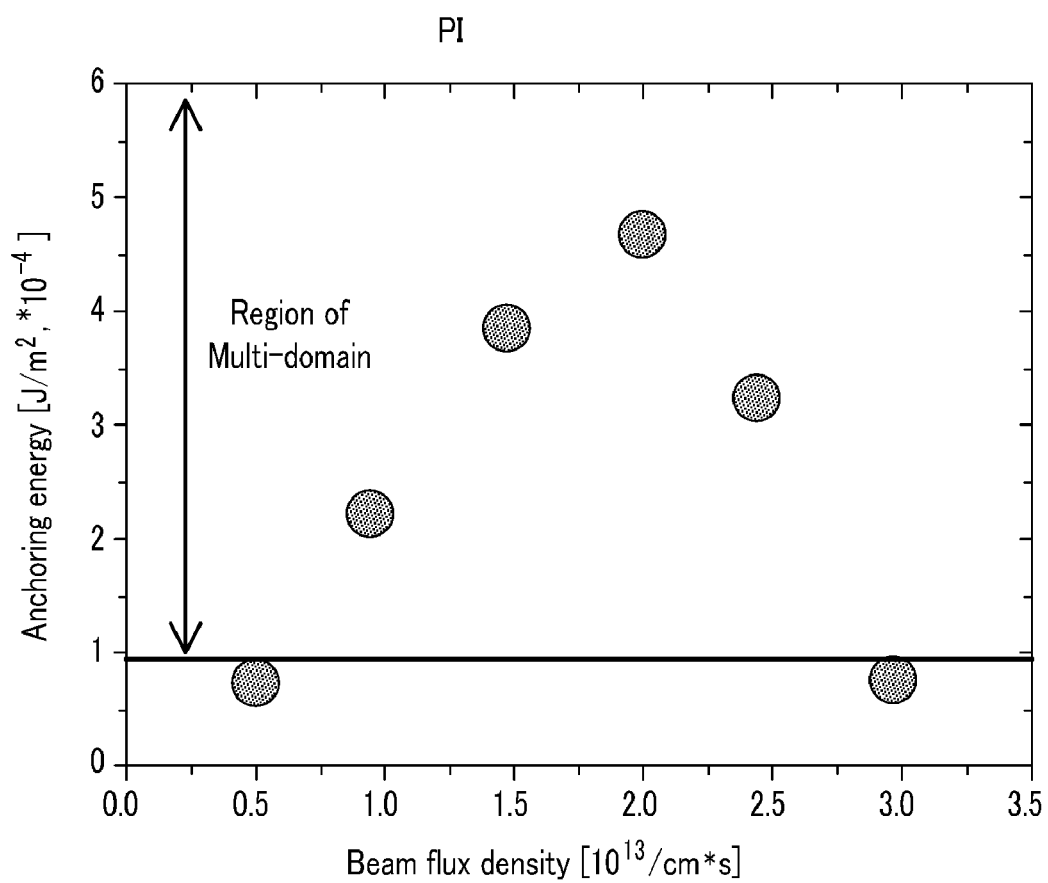
FIG. 15 is a graph illustrating anchoring energy and thermal stability according to a temperature of forming an alignment layer.

FIG. 12 is a graph showing a size of a bad alignment region according to a distance between an alignment layer and a mask, and FIG. 13 is a graph illustrating a size of a bad alignment region according to a pattern of a mask. FIG. 14 is a graph showing an ion beam energy range and an ion beam radiation density range for forming a plurality of domains, and FIG. 15 is a graph illustrating anchoring energy and thermal stability according to a temperature of forming an alignment layer.

In the experimental setup used to provide the experimental data shown in FIG. 12 to FIG. 15, an ion beam source is a cold hollow cathode ("CHC") type of ion beam source, ion beam energy is about 60 eV, an ion beam radiation angle is about 80°, ion beam radiation duration is about 1 s., and ion beam radiation density is about $2.5 \times 10^{13}$ $Ar^+/s.cm^2$.

Referring to FIG. 12, if a distance ("d") between the alignment layers 11 and 21 and the masks 70 and 80 is shorter than about 200 μm, a width (disclination width) of a bad alignment region ("B") may be sustained to be shorter than about 20 μm. Such a range of the bad alignment region ("B") may be completely blocked by a light blocking member of an LCD. If a width of the bad alignment region ("B") is larger than about 20 μm, display defects are generated. If the distance ("d") between the alignment layers 11 and 21 and the masks 70 and 80 is sustained shorter than about 100 μm, it is possible to sustain a width of a bad alignment region ("B") to be shorter than about 15 μm. Therefore, this is of great advantage in preventing the display defects. However, if the distance (d) between the alignment layers 11 and 21 and the masks 70 and 80 is shorter than about 20 μm, it may become difficult to provide a uniform separation between the masks 70 and 80. In one exemplary embodiment, the distance ("d") between the mask and the liquid crystal alignment layer may be shorter than about 200 μm. In one exemplary embodiment, the distance ("d") between the mask and the liquid crystal alignment layer may be about 20 µm to about 50 µm.

Referring to FIG. 13, the graph clearly shows that bad alignment is not generated if a mask pattern width is from about 100 µm to about 1000 µm. This means that the bad alignment can be prevented even though a mask pattern width is large compared to an inorganic alignment layer. Although a pretilt angle may be used for improving transparency by forming a plurality of domains, it is difficult to realize a perfect black state because light leakage is generated in a normal black state if a slope becomes large because the pretilt angle is smaller than about 85°. An experiment of forming a domain in a pixel and an experiment of forming a plurality of domains in a pixel were performed. According to the experimental results, one domain was vertically aligned at an ion beam energy range from about 30 eV to about 70 eV at an ion beam radiation density of about 1-3×10$^{13}$ Ar$^+$/s.cm$^2$, and the plurality of domains were vertically aligned at an ion beam energy range from about 40 eV to about 60 eV and an ion beam radiation density of about 1-2.5×10$^{13}$ Ar$^+$/s.cm$^2$. That is, in order to form a plurality of domains in a pixel, the ion beam energy range may be from about 40 eV to about 60 eV and the ion beam radiation density range may be from about 1×10$^{13}$ Ar$^+$/s.cm$^2$ to about 2.5×10$^{13}$ Ar$^+$/s.cm$^2$ as shown in FIG. 14.

Referring to FIG. 15, the horizontal axis denotes beam flux density of an organic layer for forming the alignment layers 11 and 21 on the pixel electrode 191, and the left vertical axis denotes anchoring energy. The graph clearly shows that the organic layer may be formed at room temperature of about 30° C. to about 40° C., the anchoring energy is secured up to about 1×10$^{-4}$J/m$^2$ if the organic layer is preheated at about 100-200° C., and thermal stability is also secured up to about 100° C. to 120° C.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A liquid crystal display, comprising:
   a first substrate;
   a gate line disposed on the first substrate, a data line disposed substantially perpendicular to the gate line on the first substrate, and a plurality of thin film transistors electrically connected to the gate line and the data line;
   a plurality of pixel electrodes disposed on the plurality of thin film transistors, respectively;
   a plurality of pixels, each pixel including one of the plurality of pixel electrodes, each pixel including a first sub-pixel and a second sub-pixel adjacent to the first sub-pixel;
   a first organic alignment layer disposed on the plurality of pixel electrodes and including at least two alignment regions each having a different alignment direction;
   a second substrate corresponding to the first substrate;
   a common electrode disposed on the second substrate; and
   a second organic alignment layer disposed on the common electrode and including at least two alignment regions each having a different alignment direction from each other and from the alignment directions of the at least two alignment regions of the first organic alignment layer,
   wherein the first organic alignment layer is formed by radiating an ion beam at a radiation angle tilted in a direction that is substantially parallel with the data line, and the second organic alignment layer is formed by radiating an ion beam at a radiation angle tilted in a direction that is substantially parallel with the gate line, and
   wherein alignment directions in any pair of adjacent domains defined by adjacent first and second sub-pixels are parallel to a boundary therebetween.

2. The liquid crystal display of claim 1, wherein the first and second organic layers include polyimide.

3. The liquid crystal display of claim 2, wherein
   an alignment direction of the first organic alignment layer has a pretilt angle which faces in a first direction which corresponds to an upward direction as seen from a top plan view in the first sub-pixel and has a pretilt angle which faces in a second direction substantially opposite to the first direction as seen from a top plan view in the second sub-pixel in each pixel.

4. The liquid crystal display of claim 3, wherein an alignment direction of the second organic alignment layer corresponding to the first organic alignment layer has a pretilt angle which faces a third direction which corresponds to a leftward direction as seen from a top plan view in an upper sub-pixel area and has a pretilt angle which faces a fourth direction substantially opposite the third direction as seen from a top plan view in a lower sub-pixel area in each pixel.

5. The liquid crystal display of claim 3, wherein an alignment direction of the second organic alignment layer corresponding to the first organic alignment layer has a pretilt angle which faces a fourth direction which corresponds to a rightward direction as seen from a top plan view in an upper sub-pixel and has a pretilt angle which faces a third direction substantially opposite the fourth direction as seen from a top plan view in a lower sub-pixel in a pixel.

6. The liquid crystal display of claim 3, wherein the first sub-pixel is located to the left side of the second sub-pixel in each pixel as seen from a top plan view.

7. The liquid crystal display of claim 1, wherein the ion beam energy is about 4 eV to about 60 eV, and the ion beam radiation density is about 1×10$^{13}$ Ar+/s.cm$^2$ to about 2.5×10$^{13}$ Ar+/s.cm$^2$.

8. The liquid crystal display of claim 7, wherein an angle of radiating the ion beam is about 60° to about 85° from a horizontal plane substantially parallel to the normal surface of the respective first organic alignment layer and second organic alignment layer.

9. The liquid crystal display of claim 8, wherein the ion beam is tilted in several directions during the formation of the first organic alignment layer and the second organic alignment layer, including to the left side, the right side, the top, and the bottom of the first substrate and the second substrate, and the ion beam is radiated at substantially the same angle from the horizontal plane.

10. The liquid crystal display of claim 1, wherein thicknesses of the first and second organic alignment layers are each about 50 nm.

11. A method for manufacturing a liquid crystal display comprising:
   disposing a thin film transistor having an input terminal and an output terminal on a first substrate;
   connecting a pixel electrode to the output terminal;
   disposing an organic layer on the pixel electrode;
   forming a first alignment layer having at least two different alignment directions by disposing a mask on the organic layer and radiating an ion beam to the organic layer;
   disposing a common electrode on a second substrate corresponding to the first substrate;

forming a second alignment layer having at least two different alignment directions on the common electrode; and disposing a liquid crystal layer between the first alignment layer and the second alignment layer, wherein the forming a first alignment layer comprises:

radiating the ion beam at a first radiation angle in a first strip region in a pixel, and radiating an ion beam at a second radiation angle tilted substantially opposite to the first radiation angle in a second strip region in the pixel, the pixel including a first sub-pixel and a second sub-pixel adjacent to the first sub-pixel, and wherein alignment directions in a pair of adjacent domains defined by the adjacent first and second sub-pixels are parallel to a boundary therebetween.

12. The method of claim 11, wherein the forming a second alignment layer includes:

radiating an ion beam at a third radiation angle which is tilted in the left direction as seen from a top plan view in an upper sub-pixel positioned at an upper side of a pixel, and radiating the ion beam at a fourth radiation angle which is tilted in the right direction as seen from a top plan view in a lower sub-pixel positioned at a lower side of the pixel.

13. The method of claim 11, wherein the forming a second alignment layer includes:

radiating an ion beam at a fourth radiation angle which is tilted in the right direction as seen from a top plan view in an upper sub-pixel positioned at an upper side of a pixel, and radiating the ion beam at a third radiation angle which is tilted in the left direction as seen from a top plan view in a lower sub-pixel positioned at a lower side of the pixel.

14. The method of claim 11, wherein the first strip region has a pretilt facing in an upward direction as seen from a top plan view by radiating an ion beam at the first radiation angle.

15. The method of claim 11, wherein a distance between the organic layer and the mask is shorter than about 200 μm in the forming a first alignment layer.

16. The method of claim 11, wherein an angle of radiating an ion beam to the organic layer is about 60° to about 85° from a surface of the first substrate in the forming a first alignment layer.

17. The method of claim 11, wherein energy of the ion beam is about 4 eV to about 60 eV, and a radiation density of the ion beam is about $1 \times 10^{13}$ Ar+/s.cm$^2$ to about $2.5 \times 10^{13}$ Ar+/s.cm$^2$.

18. The method of claim 11, wherein the organic layer is disposed on the pixel electrode using one of a spin coating method, a print method, and an inkjet print method, and at a temperature of about 30° C. to about 40° C.

19. The method of claim 11, wherein a thickness of the organic layer is about 50 nm.

20. The method of claim 11, wherein the organic layer includes polyimide.

21. The method of claim 11, wherein a source of the ion beam is a cold hollow cathode ion beam source.

22. The method of claim 11, wherein the ion beam includes argon ions.

23. The method of claim 11, wherein a distance between the organic layer and the mask is about 20 μm to about 50 μm when the ion beam is radiated.

24. The method of claim 11, wherein the mask has an opening for letting the ion beam pass through, and the width of the opening is about 100 μm to about 1000 μm.

25. The method of claim 24, wherein the mask is made of one of stainless steel and aluminum.

* * * * *